United States Patent [19]

Nohmi et al.

[11] Patent Number: 4,801,855

[45] Date of Patent: Jan. 31, 1989

[54] METHOD AND SYSTEM FOR CONTROLLING CHOPPER

[75] Inventors: Makoto Nohmi, Kawasaki; Eiji Kozu, Ehime, both of Japan

[73] Assignee: Hitachi, Ltd., Tokyo, Japan

[21] Appl. No.: 63,417

[22] Filed: Jun. 18, 1987

[30] Foreign Application Priority Data

Jun. 20, 1986 [JP] Japan .............................. 61-142993

[51] Int. Cl.$^4$ .............................................. H02P 5/16
[52] U.S. Cl. .................................... 318/338; 318/336; 318/342; 318/268
[58] Field of Search ................ 318/336, 338, 311–318, 318/326, 327, 339, 342, 257, 258, 268, 599, 338; 363/124

[56] References Cited

U.S. PATENT DOCUMENTS

| | | | |
|---|---|---|---|
| 4,284,932 | 8/1981 | Kawada et al. | 318/338 |
| 4,461,958 | 7/1984 | Krohling et al. | 318/336 |
| 4,570,111 | 2/1986 | Sato | 318/338 |
| 4,578,626 | 3/1986 | Richter | 318/338 |
| 4,684,859 | 8/1987 | Nohmi et al. | 318/332 |

Primary Examiner—William M. Shoop, Jr.
Assistant Examiner—Brian Young
Attorney, Agent, or Firm—Antonelli, Terry & Wands

[57] ABSTRACT

The magnitude of current change for the change of input voltage or for the change of speed of rotation of the shunt motor is utilized, i.e., the shunt characteristics are utilized, and the voltage applied to the motor is limited so that the armature current decreases by an amount that corresponds to the increase in the armature voltage when slipping and to the decrease in the armature voltage when sliding have taken place, thereby to obtain improved adhesion characteristics. For this purpose according to the invention, an electromotive force of the motor is calculated from a motor speed detected by a detector and from a field current of the motor, a voltage drop caused by the motor resistance and the motor current is calculated, a motor voltage is calculated by adding the thus calculated voltage drop to the electromotive force of the motor, and the voltage applied to the motor is limited depending upon the calculated motor voltage.

16 Claims, 4 Drawing Sheets

METHOD AND SYSTEM FOR CONTROLLING CHOPPER

BACKGROUND OF THE INVENTION

1. Field of the Invention

The present invention relates to control of a chopper of a motor for railway vehicles. More specifically, the invention relates to a method and a system for controlling a chopper adapted to preventing the wheels from slipping during a traction mode and sliding during a braking mode and to increasing the tractive and braking force to a limit of adhesion between the wheels and the rails, in order to obtain good acceleration characteristics.

2. Description of the Prior Art

When a D.C. motor is driven through a chopper, in general, the constant-current control is carried out in order to obtain a constant acceleration. The constant-current control is continued even when the wheel axle undergoes the slipping and sliding. To prevent this, therefore, a method has been employed to detect the slipping and sliding, and to suppress the current command. The detection means consists of detecting the slipping and sliding depending upon the voltage differences or speed differences among a plurality of axle motors or depending upon the speed difference from that of the unforced axles, thereby to reduce the command current.

According to the above-mentioned prior art in which the slipping and sliding are detected relying upon the voltage difference or speed difference, and the difference is processed to decrease the command, however, the control lag is necessarily involved. Furthermore, a dead band of a given width must be provided to cope with error in the wheel diameter involving the control lag, too. Therefore, the response is not sharp for the slipping and sliding and, accordingly, limitation is imposed on the control performance.

SUMMARY OF THE INVENTION

The object of the present invention is to realize high response characteristics for the slipping and sliding by solving the problem that stems from the conventional system in which the ordinary control and the control for the slipping and sliding are effected separately from each other, i.e., by performing the two control operations in a combined manner utilizing the characteristics inherent in the motor.

In order to achieve the above object according to the present invention, an electromotive force of a motor is calculated from a speed of rotation of the motor detected by means which detects the speed of rotation of the motor and from a field current of the motor, a voltage drop caused by the motor resistance and motor current is calculated, a motor voltage is calculated by adding the thus calculated voltage drop to the electromotive force of the motor, and the voltage applied to the motor is controlled depending upon the calculated motor voltage.

DETAILED DESCRIPTION OF THE PREFERRED EMBODIMENTS

Figure 1:
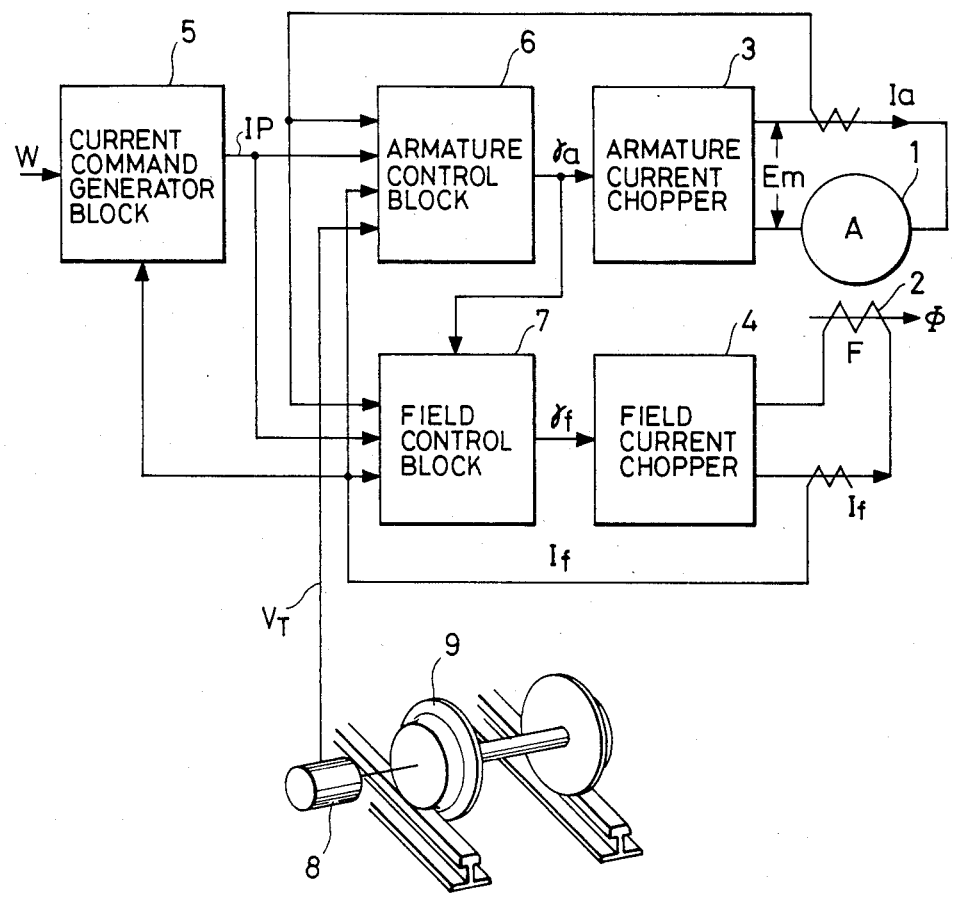
FIG. 1 is a block diagram illustrating the structure of a system according to an embodiment of the present invention.

The D.C. motors can be roughly divided into series motors and shunt motors. The series motor has a field and an armature that are connected in series, and can be easily controlled since the current is relatively insensible against the change in the voltage applied to the motor and the electromotive force of the armature. However, since the current changes slowly, too, for the slipping and sliding, the series motor exhibits poor adhesion characteristics. The shunt motor, on the other hand, has an armature and a field that are separated from each other, and can be controlled involving difficulty since the current greatly changes even for a slight change in the applied voltage and the electromotive force of the armature. During the slipping and sliding, however, the armature current decreases abruptly, permitting the shunt motor to exhibit good adhesion. When the motor is applied to the vehicle, however, the constant-current control is carried out by the chopper to obtain constant acceleration and deceleration ratio. Therefore, when the current decreases due to the development of slipping and sliding, the control system compensates for the change to maintain the current constant. That is, adhesion characteristics of the shunt motor are lost. According to the present invention, the magnitude of current change for the change of input voltage or for the change of speed of rotation of the shunt motor is utilized, i.e., the shunt characteristics are utilized, and the voltage applied to the motor is limited so that the armature current decreases by an amount that corresponds to the increase in the armature voltage when slipping and sliding have taken place thereby to obtain improved adhesion characteristics.

The armature electromotive force Ea of a dc motor changes in proportion to the product of a motor speed Vm and a field flux $\phi_f$;

$$Ea = K_1 \cdot Vm \cdot \phi_f$$

If the voltage applied to the motor is denoted by Em, then the electric current Ia that flows into the armature is given by, $$Ia = \frac{Em - Ea}{Ra}$$

where Ra denotes the armature resistance.

In this case, the torque Tm of the motor is given by, $$Tm = K_2 \cdot Ia \cdot \phi_f$$

If the applied voltage Em is maintained constant, the change in the motor speed Vm is directly reflected by the electromotive force Ea to represent the change in the armature current Ia. In this case, the armature resistance Ra is generally very small and changes sensibly even for a slight change in the electromotive force Ea.

With reference to the vehicles, when the slipping or sliding V are not taking place, the motor speed Vm and the train speed establish a proportional relationship. If the vehicle speed detected from an axle that is not driven by the motor is presumed to be $Vm=V_T$, then a predictive value $Ea'$ of the armature electromotive force can be given by, $$Ea'=Khd\cdot 1\cdot V_T\phi_f=Ea$$

That is, if the vehicle speed and the field flux are known, then the armature voltage can be found by calculation. Therefore, a desired armature current Ia can be obtained if the motor is served with the voltage Em to which a voltage drop Ia.Ra caused by the armature resistance is added. In practice, however, the wheels of the vehicles have diameters that are slightly different from each other, and the armature resistance Ra also changes with the rise in temperature of the winding, so that difference develops between the voltage Em and the voltage Em'. In effect, it is allowed to directly apply the voltage Em'. It is therefore attempted to calculate the voltage Em' differently from the ordinary control system, to find a voltage Em'' which consists of the voltage Em' to which an allowable error is added, to compare the voltage Em obtained by the ordinary control operation with the voltage Em'', to control the current command relying upon the difference, and to suppress the voltage Em so that it does not become greater than Em''. In case the armature voltage rises due to the slipping, therefore, the current is suppressed so that the slipping will not take place anymore. Here, however, a problem arises. That is, when the wheels have diameters that contain deviation of a large degree, the dead band of an increased width must be provided to cope with the error. Therefore, the current cannot be suppressed even when slipping takes place in the dead band, and the effect cannot be obtained sufficiently. Therefore, correction is effected to reduce the difference between the applied voltage Em and the predictive value Em'', the correction being effected slowly to cope with sudden slipping and to minimize the amount of slipping.

An embodiment of the invention will now be described in conjunction with FIG. 1 which illustrates the structure of a whole drive system exemplifying the chopper drive of a railway vehicle.

In the structure of FIG. 1, a current command generator block 5 generates a command current Ip based upon a load W given from an external unit, and sends it to an armature control block 6 and to a field control block 7. Relying upon the speed $V_T$ detected by a speed detector 8 mounted on a wheel 9, the armature control block 6 detects the armature current Ia relative to the command current Ip and controls a conduction ratio $\gamma_a$ of a chopper 3 so that the armature current Ia becomes equal to the command current Ip. The voltage Em is then applied to the motor armature 1 depending upon the conduction ratio $\gamma_a$, to control the armature current.

A field control block 7 calculates an optimum field current based upon the command current Ip and the armature current Ia, and gives a conduction ratio $\gamma_f$ to a field current chopper 4, so that a desired field current $I_f$ is supplied to a motor field 2. Depending upon the conduction ratio $\gamma_a$ of the armature control block, furthermore, the field control block 7 adjusts the field current so that the conduction ratio $\gamma_a$ of the armature will not exceed a limit value.

In the above-mentioned fundamental structure and control formation, slip of a wheel driven by the motor causes the armature electromotive force to rise and the armature current Ia to decrease. The armature control system compensates the reduction of current Ia, and works to increase the voltage Em so that the armature current Ia assumes a value as commanded. Accordingly, the armature current Ia becomes constant. As the wheel undergoes the slipping, however, the adhesion ratio decreases between the wheel and the rail, and the degree of slipping further increases. Therefore, the wheel cannot be prevented from slipping unless the current is reduced with the development of slipping to decrease the torque. According to the present invention, therefore, the armature control block 6 detects the train speed Vm that is obtained from a wheel axle, i.e., from an unforced axle that is not driven by the motor, calculates the voltage Em that should be applied to the armature when there is taking place no slipping, and limits the armature voltage to be smaller than the thus calculated value, in order to suppress the slipping. Means for preventing the slipping will now be concretely described.

Figure 2:
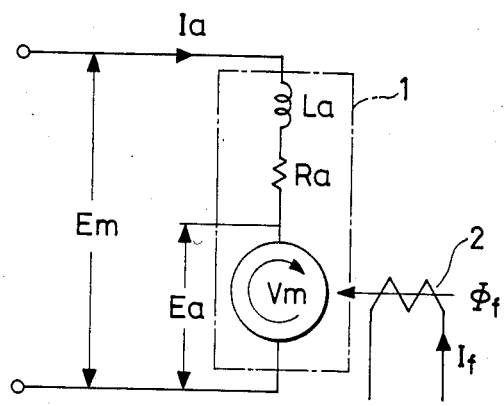
FIG. 2 is a diagram of an equivalent circuit of a shunt motor.
Figure 3:
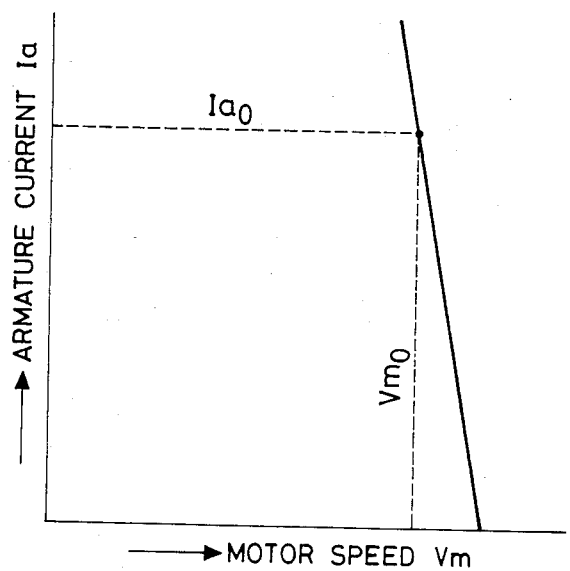
FIG. 3 is a diagram showing the characteristics thereof.

FIG. 2 shows the armature circuit of the motor. The armature generates the electromotive force Ea that is proportional to the product of a motor speed Vm and a field flux $\phi_f$. A current Ia determined by the difference of the electromotive force Ea from the applied voltage Em and the internal resistance Ra, flows in the armature. When the applied voltage Em is maintained constant, the armature current Ia decreases with the increase of the motor speed Vm. Generally, however, the armature resistance Ra is very small to reduce the loss, and the current Ia changes sharply even for a slight change in the speed. This is a so-called shunt characteristic: if the voltage is maintained constant, the current decreases even when the slipping takes place so that the speed is maintained constant. Though the motor is under the accelerating condition and the speed is not maintained constant, it means that the voltage is boosted by an amount to cope with the rise of the speed to suppress the excess of speed caused by slipping.

Figure 4:
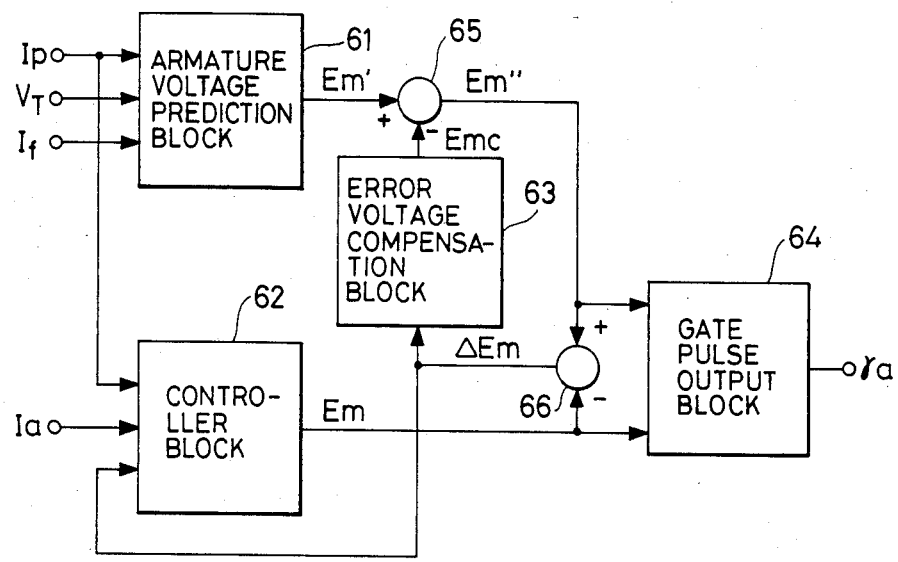
FIG. 4 is a block diagram illustrating in detail the major portions of the embodiment of FIG. 1.

FIG. 4 illustrates in detail the armature control block 6, wherein an armature voltage prediction block 61 calculates a predictive value $\phi_f$ of the field flux $\phi_f$ from a field current If relying upon a field characteristics curve, and calculates a required armature voltage Em' based upon a train speed $V_T$ obtained from the speed detector 8, the command current Ip and the internal resistance Ra of the motor in accordance with the following equation, $$Em'=K_1\cdot\phi_f V_T+I_p\cdot Ra \qquad (1)$$

If no error is contained in all of the values, application of the voltage Em to the armature will enable the armature current Ia to become equal to the desired value Ip. In detecting the train speed, however, error is involved in the diameters between the wheel of the axle of the detecting side and the wheel of the axle of the side driven by the motor and in the armature resistance that changes depending upon the temperature of the winding. Therefore, the armature voltage Em' found here cannot be used for driving the motor.

The control operation therefore is performed by a controller block 62. Here, the voltage Em to be applied to the motor is calculated by the feedback control, and a chopper conduction ratio $\gamma_a$ based thereupon is commanded.

The armature voltage prediction block 61 adds an error component Eme to the voltage calculated according to the equation (1) to produce a predictive value Em'. Here, an error voltage compensation block 63 compares the voltage Em produced from the controller block 62 with the predictive value Em', calculates a compensation voltage Emc such that the difference thereof will become equal to the voltage drop Ia·Ra by the armature resistance Ra, and whereby a voltage Em''=Em'+Emc is used as a voltage limit. In FIG. 4, Em'' is compared with Em to adjust Emc.

Here, a gate pulse output block 64 compares Em with Em'', and determines the chopper conduction ratio $\gamma_a$ based upon a smaller value between them.

Figure 5:
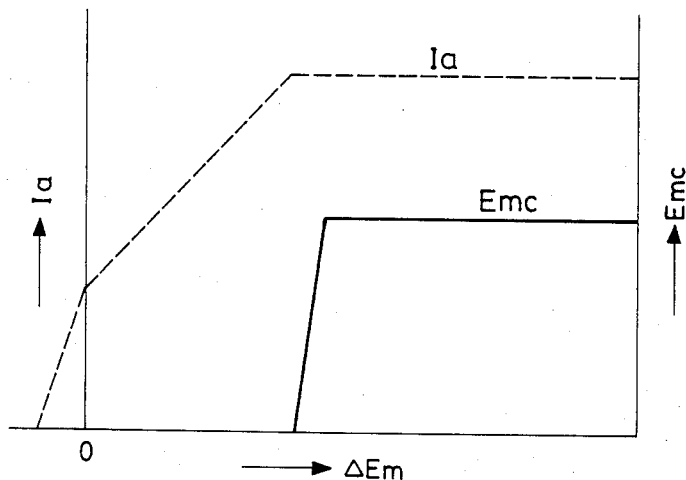
FIG. 5 is a diagram showing the control characteristics thereof.

When the difference ΔEm is sufficiently great between Em and Em'', the controller block 62 maintains the current command constant. As the difference ΔEm approaches zero, the control block 62 so corrects the command current Ip that it decreases. When there takes place slipping, therefore, the voltage Em rises and the difference ΔEm decreases, so that the current command decreases and the armature current Ia decreases. The voltage Em that further rises is then absolutely limited by Em''. FIG. 5 shows a relationship among the voltage difference ΔEm, armature current Ia and compensation voltage Emc. Here, the compensation voltage Emc is maintained constant when the voltage difference ΔEm becomes large because of the reasons mentioned below. That is, when the voltage Em of the control system is excessively decreased, the compensation voltage is limited from increasing any more. This is to offset the effect of voltage drop caused by the inductance of the motor when the armature current is suddenly reduced due to some reasons.

If the compensation voltage Emc is corresponded to the voltage difference ΔEm, however, decrease of Emc with the increase of Em as a result of slipping offsets the effect for suppressing the slipping. Therefore, the compensation voltage Emc calculation block produces the compensation voltage Emc maintaining a sufficiently long time constant. The compensation voltage Emc is to correct error, and needs not be changed suddenly.

Figure 6:
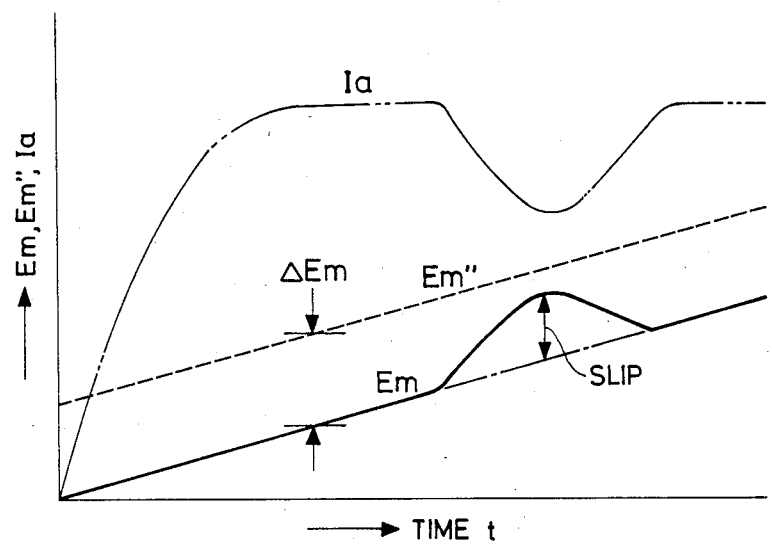
FIGS. 6 and 7 are diagrams illustrating the dynamic characteristics of the systems according to the present invention.
Figure 7:
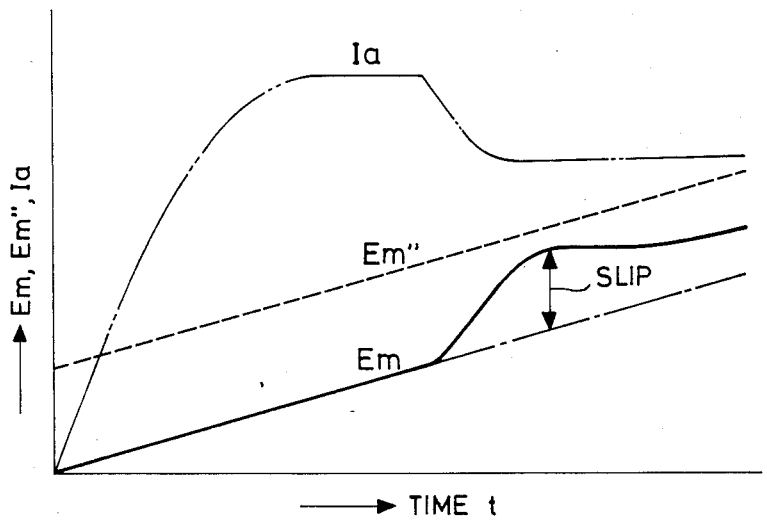

FIGS. 6 and 7 illustrate the operation of the chopper of the case when slipping has developed.

FIG. 6 shows the condition where the voltage rises as a result of slipping, whereby the current Ia decreases as the voltage approaches Em'', and the initial state is resumed when there is no slipping. FIG. 7 shows the condition where the slipping is not completely suppressed but continues to a small degree. This is determined by whether the cause of slipping lasts temporarily or continuously. When the cause lasts continuously, it can be contrived to discriminate the condition and to decrease the command itself.

In the foregoing was described the case of powering in other words acceleration control. In the case of the regeneration in other words brake control, the operation can be carried out in the same manner as that of the powering except that the motor voltage becomes smaller than the armature electromotive force and the voltage limit becomes much smaller than the armature electromotive force, which are contrary to those of the powering, and that the command consists of the braking force in several stages.

In the foregoing was described the case where the speed was detected from the unforced axle. Even when the speed is detected from the drive axle, the smallest speed (the largest speed during the regeneration in the case of powering) can be selected provided nether the slip develops simultaneously nor the characteristics changes quite in the same manner. This is because, the wheels between the drive axles has generally been so designed that the error in the diameters thereof will decrease.

As described above, the motor voltage is predicted from the speed of the train and the armature voltage is controlled relying upon the predicted motor voltage, in order to suppress the armature voltage from rising when the slip has developed. Therefore, the slip is prevented from occurring. Consequently, the torque can be increased up to the limit of adhesion of the wheels, contributing to improving the acceleration performance of the vehicles. Or, the train can be driven with the motor of a small capacity, presenting great advantage in performance and economy.

In particular, there develops no large ripple in the torque when the slip is detected or during the slipping caused by the control lag. Therefore, the torque does not decrease and the stress imparted to the mechanical system does not increase, making it possible to realize improved control operation maintaining high reliability.

We claim:

1. A method for controlling a chopper comprising:
   a step for calculating a first motor voltage to regulate motor current;
   a step for calculating a motor electromotive force from a motor speed detected by means which detects the motor speed and from a field current of the motor;
   a step for calculating a voltage drop caused by the motor resistance and motor current;
   a step for calculating a second motor voltage by adding said calculated voltage drop to said calculated motor electromotive force; and
   a step for limiting said first motor voltage within a value determined on the basis of said calculated second motor voltage.

2. A method of controlling a chopper according to claim 1, wherein said motor is the one that drives a vehicle that is to be driven by said motor, and said means which detects said motor speed is the one that detects the speed of said vehicle.

3. A method of controlling a chopper according to claim 1, wherein said motor resistance is an armature resistance, and said motor current is the one that corresponds to the armature current.

4. A method of controlling a chopper according to claim 3, wherein the current that corresponds to the armature current is a command current.

5. A method of controlling a chopper according to claim 2, wherein the vehicle speed, is detected from an unforced axle.

6. A method of controlling a chopper according to claim 2, wherein during the powering a minimum vehicle speed is selected out of vehicle speeds detected from a plurality of axles, and during the braking a maximum vehicle speed is selected out of the vehicle speeds detected from the plurality of axles.

7. A method of controlling a chopper according to claim 2, wherein the step for limiting applies the first motor voltage that is increased or decreased by an error between the diameter of a wheel of the drive axle to be controlled and the diameter of a wheel of the axle from which the speed is detected.

8. A system for controlling a chopper comprising:

means for providing a first motor voltage to regulate motor current;

means for detecting a motor speed;

means for calculating a motor electromotive force from a motor speed detected by said means and from a field current of the motor;

means for calculating a voltage drop caused by the motor resistance and motor current;

means for calculating a second motor voltage by adding said calculated voltage drop to said calculated motor electromotive force; and means for limiting said first motor voltage within a value determined on the basis of said calculated second motor voltage.

9. A system for controlling a chopper according to claim 8, wherein said motor is the one that drives a vehicle that is to be driven by said motor, and said means which detects said motor speed is the one that detects the speed of said vehicle.

10. A system for controlling a chopper according to claim 9, wherein the speed is detected from an unforced axle.

11. A system for controlling a chopper according to claim 9, wherein during the powering, said means for detecting the vehicle speed selects a minimum vehicle speed out of vehicle speeds detected from a plurality of axles and during the braking, said means for detecting the vehicle speed selects a maximum vehicle speed out of vehicle speeds detected from the plurality of axles.

12. A system for controlling a chopper according to claim 9, wherein the means for limiting the applied voltage applies the motor voltage that is increased or decreased by an error between the diameter of a wheel of the drive axle to be controlled and the diameter of a wheel of the axle from which the speed is detected.

13. A method of controlling a chopper according to claim 1, wherein said step for limiting said first motor voltage comprises:

a step for calculating a compensation voltage on the basis of the motor voltage drop;

a step for calculating a limit voltage by adding said compensation voltage to said calculated second motor voltage;

a step for limiting said first motor voltage within said calculated limit voltage.

14. A method of controlling a chopper according to claim 13, wherein, said step for calculating a compensation voltage comprises:

a step for obtaining a difference voltage between said limit voltage and said first motor voltage; and a step for calculating said compensation voltage on the basis of said difference voltage.

15. A method of controlling a chopper according to claim 13, wherein said compensation voltage has a limit value when said difference voltage is high and has a low value when said difference voltage is low.

16. A method of controlling a chopper according to claim 13, wherein said compensation voltage has a sufficiently long time constant for adhering to slipping.

* * * * *